Jan. 23, 1962 W. A. ANDERSON 3,018,044
TENS TRANSFER MECHANISM FOR AN ADDING MACHINE
Original Filed Dec. 29, 1955 7 Sheets-Sheet 1
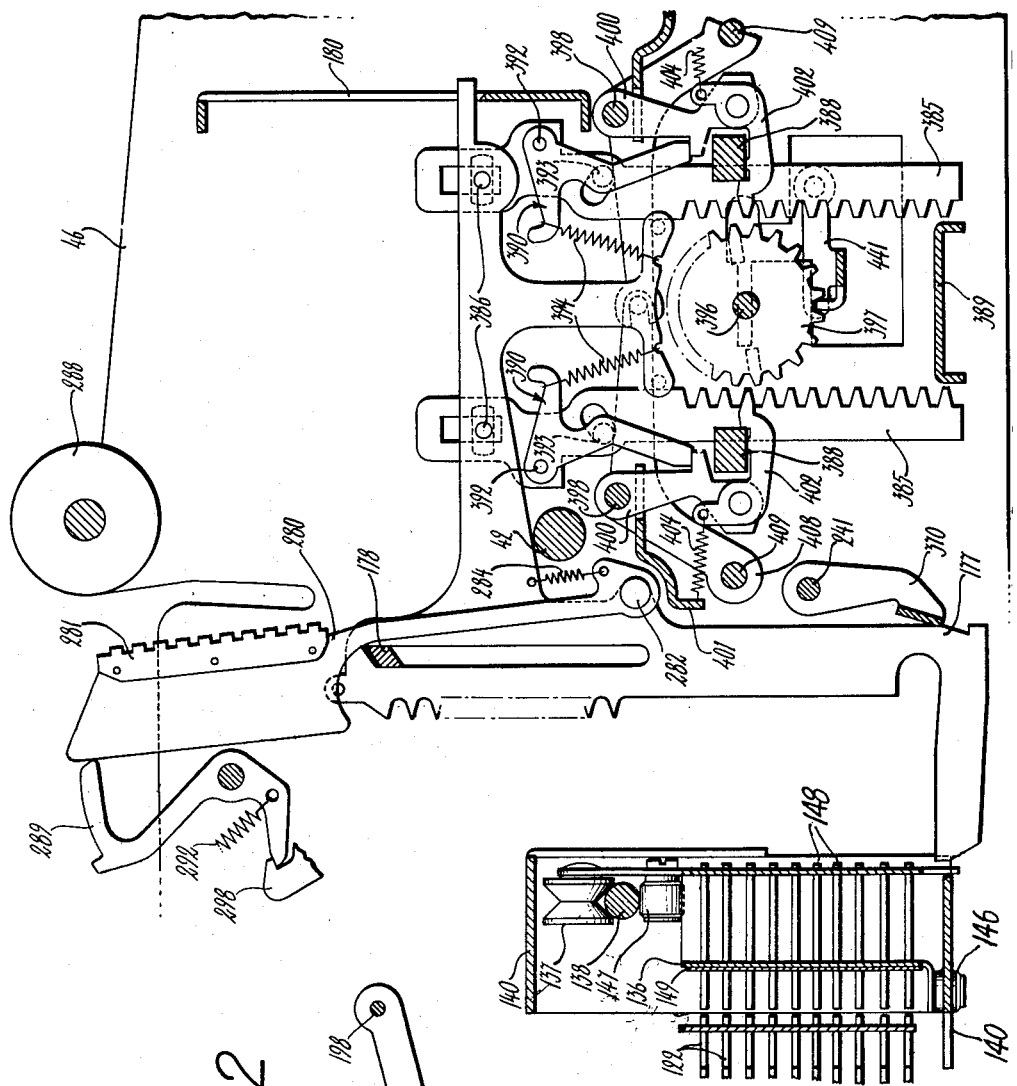
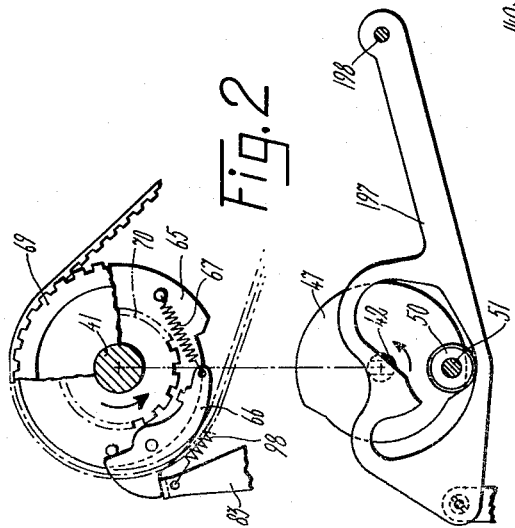

Jan. 23, 1962 W. A. ANDERSON 3,018,044
TENS TRANSFER MECHANISM FOR AN ADDING MACHINE
Original Filed Dec. 29, 1955 7 Sheets-Sheet 2

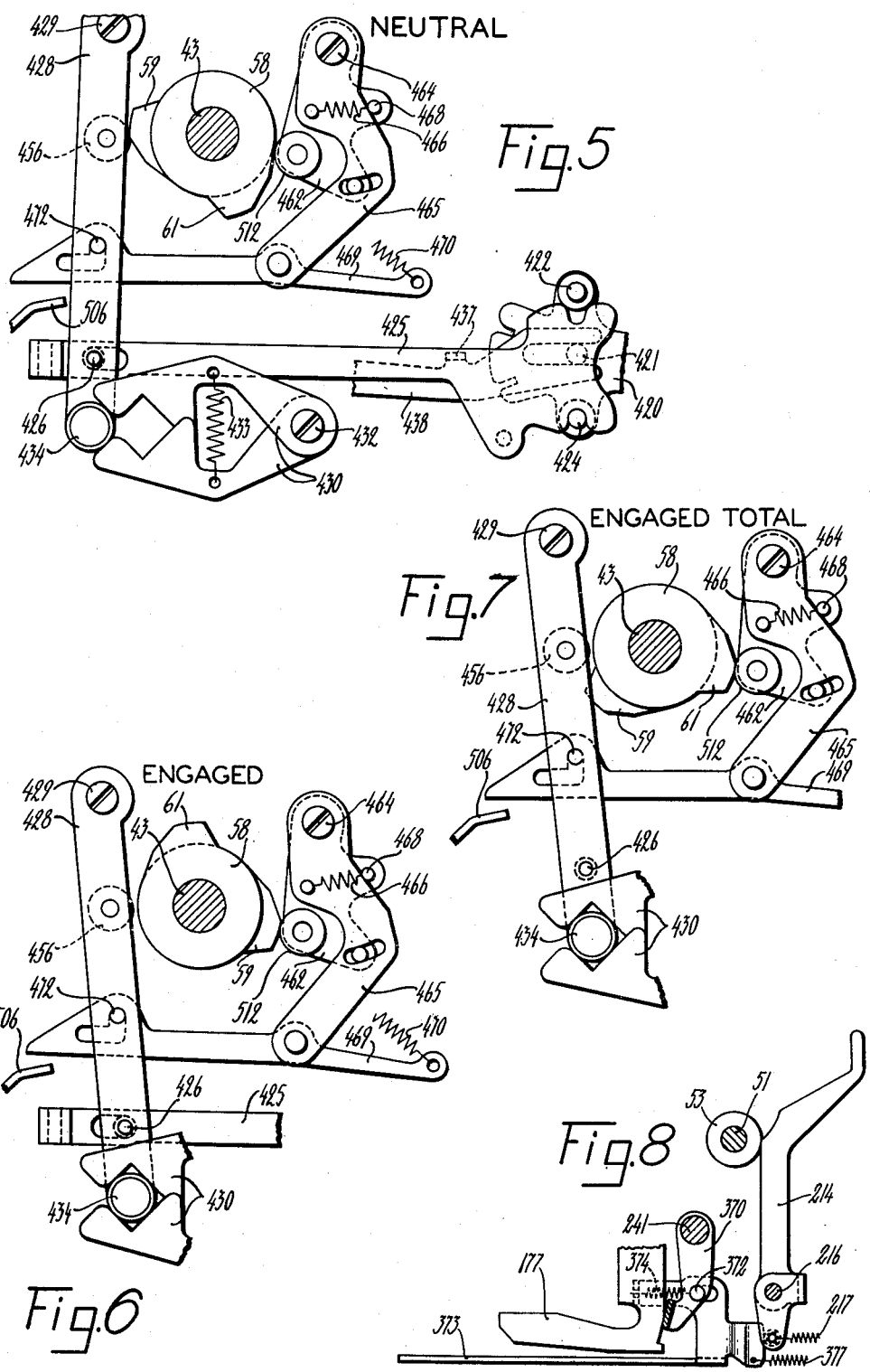

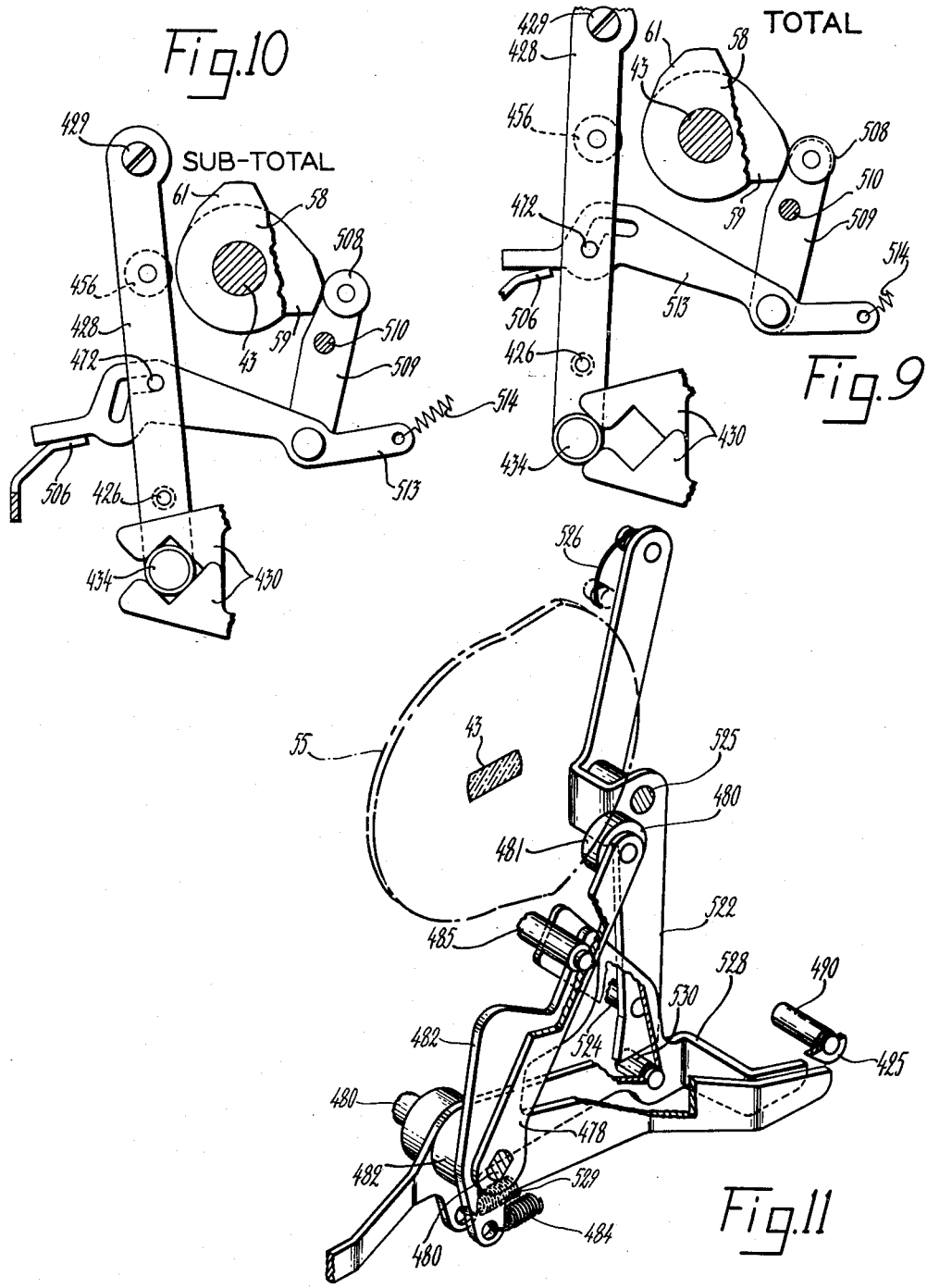

Jan. 23, 1962  W. A. ANDERSON  3,018,044
TENS TRANSFER MECHANISM FOR AN ADDING MACHINE
Original Filed Dec. 29, 1955  7 Sheets-Sheet 5

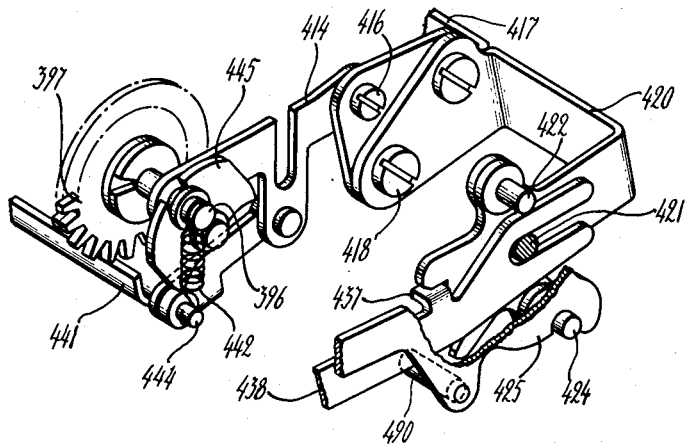
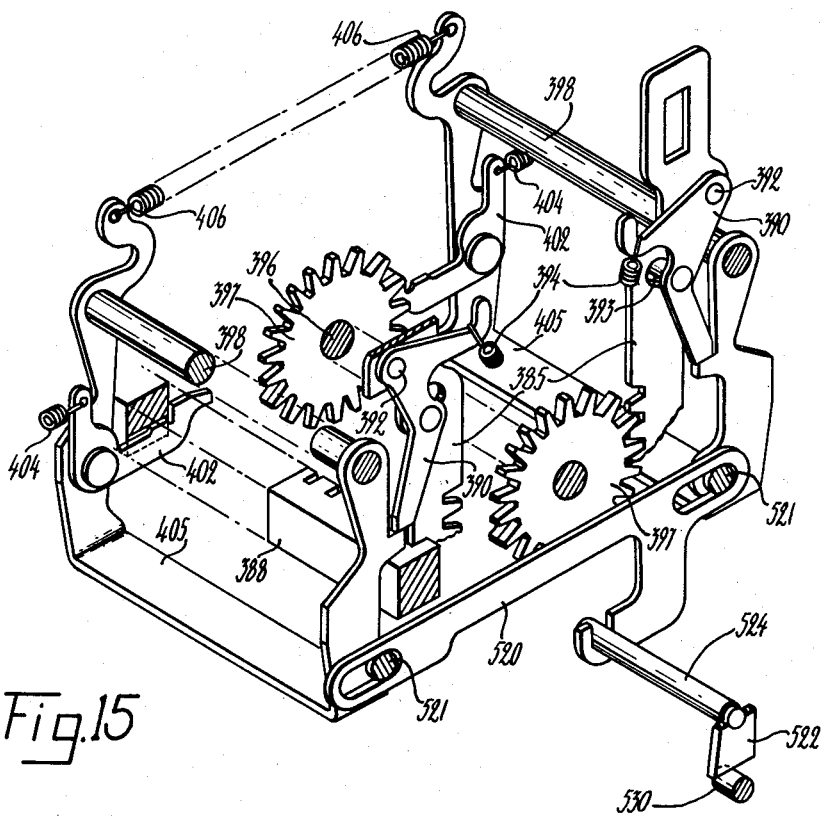

United States Patent Office 3,018,044
Patented Jan. 23, 1962

3,018,044
TENS TRANSFER MECHANISM FOR AN ADDING MACHINE

Walter A. Anderson, Trumbull, Conn., assignor to Underwood Corporation, New York, N.Y., a corporation of Delaware
Original application Dec. 29, 1955, Ser. No. 556,217, now Patent No. 2,942,776, dated June 28, 1960. Divided and this application Dec. 14, 1959, Ser. No. 2,795

5 Claims. (Cl. 235—137)

This invention relates to adding machines in general and more particularly to improvements in tens-transfer mechanisms therefor.

The subject matter covered herein is divided from application Serial No. 556,217, filed December 29, 1955, and now matured into Patent No. 2,942,776, dated June 28, 1960.

It is a general object of the invention to provide efficient, simple tens-transfer facilities organized in a manner so that total or sub-total taking operations may take place in a machine cycle directly succeeding any amount entering cycle.

It is another object of the invention to provide an efficient tens-transfer mechanism of the kind whereby register driving racks are controlled for tens-transfer function at the end of machine cycles and efficiently coordinated with other mechanism in the machine so that at any time the next succeeding cycle may be a total taking cycle.

Other objects of the invention will be apparent upon consideration of the following description of a preferred embodiment of the invention, with reference to the accompanying drawings.

For environment background reference may be had to said parent application, now Patent No. 2,942,776 which discloses more completely the machine.

Referring to the drawings:

FIGURE 1 is a right hand sectional side elevation,

FIGURE 2 is a schematic illustration from the right side of the machine portions of a machine cycling mechanism.

Figure 3:
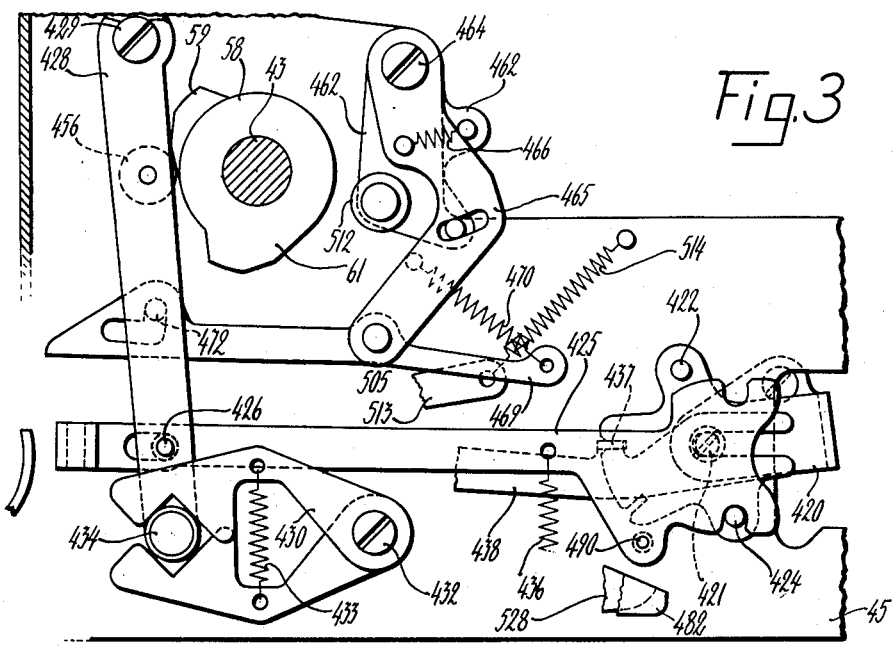
FIGURE 3 is a right side view illustrating a register controlling mechanism in a normal condition.

FIGURES 5 to 9 illustrate the register controlling mechanism of FIGURE 3 in various operating conditions wherein, FIGURE 5 shows the register engaging mechanism conditioned for disengagement of the register early in a cycle, FIGURE 6 illustrates a mid cycle condition wherein the register is moved to engage the actuators, FIGURE 7 is a view showing the register controlling mechanism in register engaging position during a total taking cycle.

Figure 12:
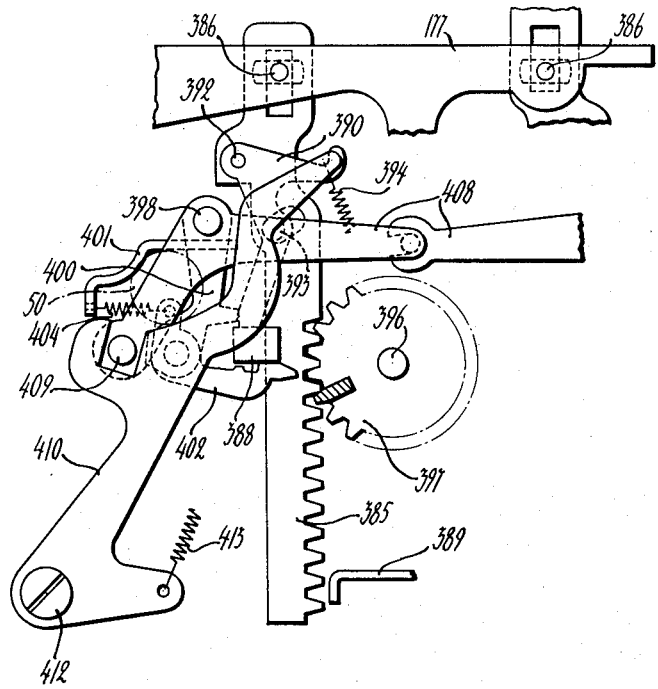
Figure 13:
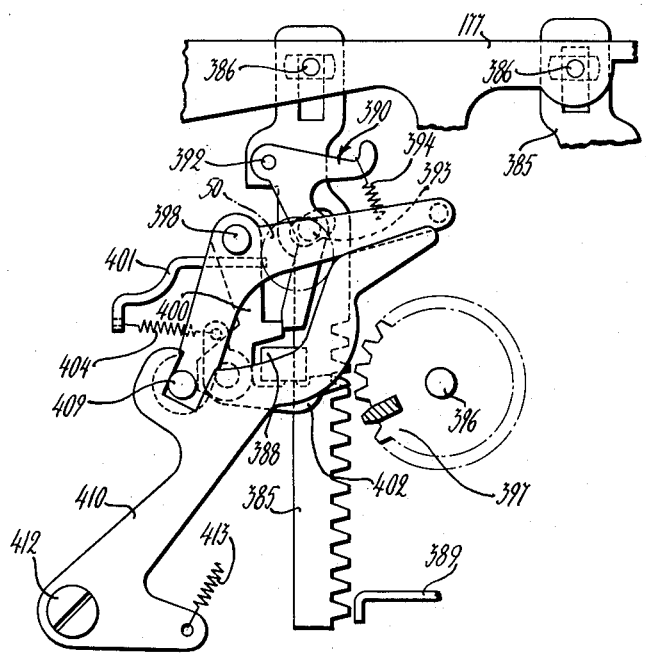

FIGURE 8 is a left side view of a mechanism to operate a zero stop bail,

FIGURE 9 shows the register controlling mechanism in a state for engaging the register in a total cycle, FIGURE 10 is a view similar to FIGURE 9 but showing the register controlling devices conditioned to leave the register in engagement for a sub-total taking, FIGURE 11 is a perspective view showing a mechanism to control the engagement of the register for subtraction and credit totals, FIGURE 12 is a right side view of a tens transfer mechanism in a condition as tripped by a lower-order register wheel, FIGURE 13 is a view similar to FIGURE 12 but with the register disengaged at the start of a following cycle and the transfer trip pawl just relatched.

Figure 16:
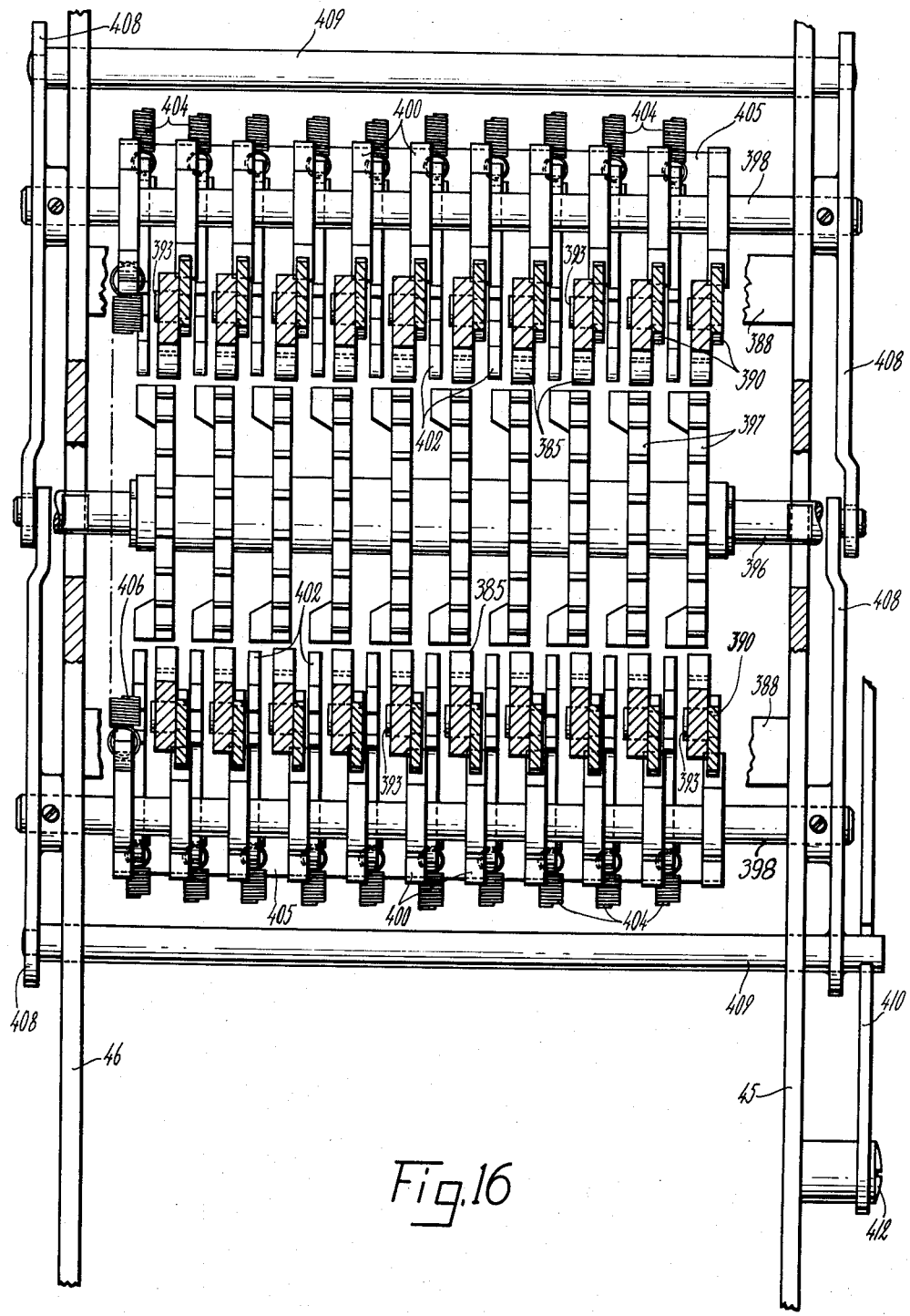

FIGURE 14 is a right hand front perspective view depicting portions of the shifting mechanism for the register, FIGURE 15 is a right hand front perspective view of a "fugitive one mechanism" for the register, and;

FIGURE 16 is a sectional plan view taken along lines 16—16 of FIGURE 1.

Referring now more particularly to FIGURE 1, a series of laterally neighboring vertically guided actuators 177 have each a pivot stud 282 which carries upreaching therefrom a type bar 280 embodying a type block 281. The type bars stand normally forwardly tilted away from a platen 288. Hammers 289 are provided to actuate the type bars 280 against the platen. All said actuators 177 are normally positioned as in FIGURE 1 with the topmost "0" type standing a digit space below typing position.

The actuators 177 have each a rearwardly reaching tail, such tails having vertical guidance in a comb plate 180.

Each actuator 177 has at the bottom a forwardly reaching foot, and vertically above and slightly in front of said feet there is disposed a stop pin carriage which comprises as many vertical rows of index or digit pins 148 as there are actuators 177. The lowest digit pins are of zero value.

The machine embodies the usual complement of amount indexing keys, not shown, under the control of which digit pins representative of amounts are projected into the paths of the actuator feet, the pin carriage in such process being moving to line up the rows of pins 148 of indexed orders appropriately with the actuators beginning from right and progressing to the left.

Referring to FIGURE 2,

The machine embodies a pulley 69 which is motor driven when the machine is in use. Such pulley is rotatable on a shaft 41 and has a toothed clutch hub 70. Turnable unitarily with the shaft 41 is a disk 65 having a clutch dog 66 thereon which is adapted to be tripped into engagement with said hub 70 by a pawl 83 to execute single cyclic turns, all in a manner well known in the art. Various function controlling keys in the machine, not shown, are adapted to trip said pawl 83 to cause single cyclic turns of the shaft 41.

The drawings show additionally to the shaft 41 a shaft 42 and a shaft 43. These shafts are all coaxial and rotate in unison.

In amount entering cycles, whether positive or negative, the actuators are required to rise to positions in accord with the value indexed in the pins 148. The mechanism for accomplishing this may be as disclosed in said Patent No. 2,942,776 or of any other suitable form and is not specifically shown or described herein. As in said patent it may include a cam arm 197 pivoted at 198 and operable by a roller 50 provided on a disk 47 which is unitary with the cycle shaft 41, the said arm in each cycle being first rising and then restoring. When said arm so reciprocates, the actuators 177, through a mechanism not illustrated but fully disclosed in said patent, rise to extents controlled by the set index pins 148 and then restore again. In the mid-phase of the cycle the actuators 177 stand differentially positioned and the hammers of significant amount orders strike appropriate type bars.

AMOUNT REGISTERING MECHANISM (Figures 1, 12, 13, 14 and 15)

Each actuator 177 has connected to its rearward extension, on studs 386, a front rack and a rear rack, both numbered 385. Between the sets of rack bars there is situated a register comprised of a set of register wheels 397 which is engageable with either set of racks, the front racks being engaged for addition and the rear racks for subtraction. Said racks 385 are connected with the studs 386 and have short slots to give them capacity for limited sliding movement on the actuators to the extent of about one digit value. Below said studs 386 the racks are guided in slots of bars 388 which have rigid support. A plate 389 which extends between the sets of racks also cooperates guidingly with the racks.

Each rack bar 385 carries pivotally on a stud 392, a stop arm 390 and each such arm is provided with a pin 393 reaching into a slot in the related rack 385. The purpose of the pins 393 and related slots is to restrict the swinging motion of the stop arms. The stop arms on the two sets of racks are of identical form but reversely arranged. A spring 394 that is connected between an inner branch of each stop arm 390 and a portion of the related actuator 177 which is disposed between the front and rear racks, urges each arm 390 along with its rack downwardly on the actuator 177 and at the same time urges the arm to swing so that its lower end is overlying a projection or lug on a counterstop arm 400, there being a set of these arms 400 for each of the sets of stop arms 390. The counterstop arms 400 of each set are carried on a rod 398 and are guided in fixed comb plates 401.

The register wheels 397 are rotatively carried on a shaft 396 and such shaft is shiftable transversely of its length in slots of side walls 45 and 46, to engage either set of racks 385. Each register wheel has twenty teeth and is provided with two diametrically opposed transfer teeth, leftwardly reaching from two of the wheel teeth. Each counterstop arm 390 has at its lower end a transfer tripping pawl 402, pivotally connected to it, there being two sets of these pawls 402 reaching from their counterstop arms 390 toward the wheels 397 of the register. Each transfer pawl is in the plane of the transfer teeth of the register wheel of the next lower order and the sets of transfer pawls underlie normally the bars 388 as in FIGURE 1.

Each transfer pawl has an upreaching arm connected by a spring 404 to a related comb plate 401, each spring urging its pawl 402 upwardly as well as away from the register wheel, but the pawl being normally restrained by a shoulder engaging the inner edge of the bar 388. By the same spring the counterstop arm 390 is urged for its lug to move from under the stop arm 390. As any register wheel 397 passes from the 9 to the 0 position or from the 0 to the 9 position, in addition and subtraction respectively, the transfer tooth thereon will engage and move the end of the transfer tripping pawl 402 downwardly to free it from bar 388. Any so freed pawl 402 by its spring 401 will consequently be moved so that its connected arm 400 will move from under the stop arm 390 of the rack bar 385 of the next higher order register wheel. Consequently, all the rack bars 385 in respect to which the counterstop arms 400 become tripped will be driven with their actuator bars 177 in distended relation thereto as such actuators in a cycle complete their downward restoring movement. Therefore, any register wheel 397 requiring a transfer step will receive an extra step of rotation in an additive or subtractive sense, depending upon whether addition or subtraction is being performed.

It is well known that if the machine is to be capable of printing negative totals and subtotals, it must in association with the tens transfer devices include a "Fugitive One" transfer provision. This provision comprises a transfer bail 405 in association with each of the sets of racks 385. Each bail 405 is pivoted on rod 398 by its two arms. The left-hand arm of each bail 405 carries a transfer tripping pawl 402 identical with that for the described transfer arms 400, and the right-hand arm has a lug to arrest the stop arm 390 at the lowest order rack 385. Therefore, each transfer bail 405 functions similarly as the described arms 400, but effects tens transfers from the leftmost to the rightmost register wheel 397. A spring 406 extending between the left arms of the transfer bails 405 assists the springs 404 in operating the transfer bail 405.

Such counterstop arms 400 and transfer tripping pawls 402 as are tripped in any machine cycle are automatically restored early in the next succeeding machine cycle and such cycle may be a total or a sub-total cycle.

Referring now to FIGURES 1, 12 and 13, a lever 408 is pivoted on each rod 396 next to each sidewall 45 and 46. Such levers at each such wall extend toward each other and have a pin and slot connection between them. The lower ends of each pair of levers 408 pivoted on the same rod 398 are connected together by a transfer pawl restoring bar 409, both such bars being normally positioned to permit the counterstop arms 400 to become moved for determining transfers. Due to the pin and slot connections between the levers 408, they rock together and may be actuated for concomitant operations of both restoring bars 409, thereby to restore any released transfer arm 400 and pawl 402 to normal, latched position. The forward restoring bar 409 is extended through the right sidewall 45 and thereat is engaged in a notch of an arm 410, see FIGURES 12 and 13. Arm 410 is pivoted on a screw 412 in sidewall 45 and is urged counterclockwise by a spring 413 to hold the connected restoring bars 409 away from the counterstop arms 400, as in FIGURE 12. During the first quarter of any machine cycle, roller 50, shown in dotted lines in the FIGURES 12 and 13 and carried on the disk 47 engages the front, cam-shaped edge of an arm 410 to rock the arm clockwise to the FIGURE 13 position and move the restoring bail 409 to the transfer mechanism restoring position. The transfer tripping pawls 402 are thereby moved into latching position by the bars 388 and move and cause the counterstop arms 400 to reside in potentially effective positions. Any rack bar 385 which in a previous cycle has completed its movement in a distended relation will have first the stop arm 390 in the way of the restoring counterstop arm 400 but will yield idly out of the way. As the actuator 177 in the cycle rises to 0 position, any rack bar 385 which has been previously lowered in a transfer operation, is raised by its related stud 386 and will being the stop arm 390 above the lug on the counterstop arm 400, whereupon such stop arm 390 will be moved by its spring 394 into cooperative alignment with the lug on the counterstop arm 400. Shortly after this time, roller 50 leaves the arm 410 which then restores under the urge of the spring 413, as well as the restoring bars 409 and the restoring levers 408.

Figure 4:
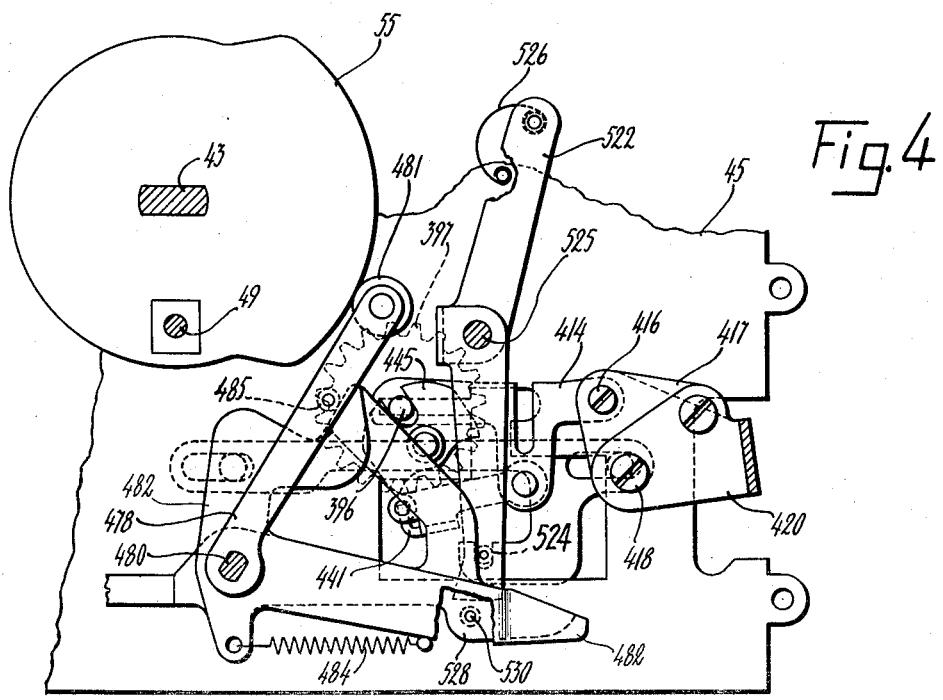
FIGURE 4 is a right side view of a mechanism to condition a register for subtraction and credit totals or sub-totals.

REGISTER ENGAGING MECHANISM (*FIGS. 3 to 5*)

Referring to FIGURES 1 and 14, the register wheels 397 are shiftable between a forward engaged position, a central position, and a rear engaged position, i.e., add, neutral, and subtract positions, by a pair of links 414 which flank the register and through which the forward ends of the register shaft 396 reach. The rear ends of the links 414 are pivotally connected at 416 to a bail 417 that extends across the back of the machine and is pivoted on screws 418 in the sidewalls 45 and 46. Unitary with the right side of bail 417 is an extension bail 420 rotatable on a stud 421 in the right auxiliary frame 54 and having a pin 422 above and another pin 424 below the stud 421. A link 425, see FIGURES 3 and 14, has two opposed notches in its rear end so spaced that it can be shifted to connect with either pin 422 or 424. Such shift takes place while the link is in a forward position. The forward end of link 425 is provided with a slot through which passes a stud 426 that is carried near the end of an arm 428 which is pivoted on a stationary stud 429. Arm 428 is swingable between two positions and in either of such positions becomes automatically retained by a detent device comprising a pair of notched detent arms 430 pivoted on a stationary stud 432 and urged together by a spring 433 against a roll 434 on the extreme end of the arm 428.

In the clockwise moved position of the arm 428 shown in FIGURE 5, the link 425 stands pulled forwardly by stud 426, and the bails 420 and 417, by the connection of the link 425 with pin 424 has moved to place the register wheels 397 to neutral positions. A spring 435, see FIGURE 3, tends to normally hold the rear end of link 425 in engagement with the pin 424 of the bail 420 but, as will be seen later, the link 425 may be lifted to engage pin 422 rather than pin 424. When the link 425 is in its rearwardly actuated position shown in FIGURE 3, the unengaged pin 422 or 424 will be opposite an unnotched surface portion of link 425 and a change of engagement of the link cannot take place.

The connected bails 420 and 417 are rocked by link 425 to engage the register wheels 397 with the forward (addition) racks 385 whenever the link is engaged with the pin 424 and receives a rearward movement, and will reversely shift the wheels 397 into the rear (subtraction) racks 385 whenever the link 425 is engaged with the pin 422 and receives the same movement. Bails 420 and 417 will be latched automatically in either of these engaged positions of the register to prevent accidental disengagement of register wheels 397 from racks 385. For this purpose, as shown in FIGURES 3 and 14, the forward side of bail 420 has two notches which may be engaged by an ear 437 of a slide 438, the manner of control of which is fully disclosed in said 2,942,776.

So long as the register wheels 397 are in meshed engagement with the racks 385, they must move in step therewith but whenever they are moved to their neutral positions, a register wheel aligner 441 becomes active to hold them, as fully disclosed in Patent No. 2,942,776.

ADDITIVE ITEM ENTRY

*(FIGS. 3, 5 and 16)*

When the item which has been indexed in the pins 148 of the pin carriage is to be entered into the register wheels 397 in an additive sense, the register wheels are required to stand engaged with the forward group of racks 385 during the return of the actuators 177 to their lower positions. After an item has been indexed, a machine cycle is initiated by a depression of an add key, not shown.

During the thus initiated machine cycle, the actuators 177 will be moved to positions corresponding to the indexed pins 148 and the set up item will be printed because the hammers strike the printing bars 280 against the platen 288. The register wheels 397 are normally left in forward or rearward engagement with the rack bars 385 at the end of each machine cycle and are moved out of engagement before the actuators 177 in the next cycle start to move upwardly. As shown in FIGURE 3, arm 428 carries a roller 456 which is positioned in alignment with the total cam 59 on shaft 43 to be driven leftwardly thereby at an initial clutch movement of the shaft 43 to FIGURE 5 position. Such movement of roller 456 and its arm 428 will shift the register wheels 397 to neutral position, out of engagement with the rack bars 385. Always this takes place in a cycle before the actuators 177 start to move the racks 385 upwardly.

SUBTRACTIVE ITEM ENTRY

*(FIGS. 3, 4, 11)*

A subtractive entry of an indexed item into register wheels 397 will be the same as above noted for addition, with the exception that the wheels 397 are engaged with the rear racks 385. A subtract key, not shown, is operated to initiate the machine cycle. During a machine cycle so instituted, the register wheels 397 will be disengaged from racks 385 in the initial phase of the cycle, as for addition, but before cam 59 acts to effect a subtractive engagement of the wheels 397, the link 425, is lifted to engage pin 422. Subtract cam 55, see FIGURES 4 and 11 will shortly after the register wheels 397 are disengaged, control its cam follower roller 481 and arm 478 so that a subtraction bell crank 482 which underlies a stud 485 on the arm 478, and is biased by a spring 484, will become operated counterclockwise. In a manner not shown the bell crank 482 is blocked against operation by the spring 484 whenever the subtraction key is in unoperated position, all as more fully disclosed in said Patent No. 2,942,776.

The rear arm of bell crank 482 lies under a pin 490 in link 425 and will lift link 425 as the bell crank 482 rocks, thereby to disengage the link 425 from pin 424 and connect it to the pin 422. A little later, when link 425 under cycle control, as already described, moves rearwardly, the bails 420 and 417 will be rocked to move the register wheels 397 rearwardly into engagement with the rear racks 385 for subtraction. Cam 55 later in the machine cycle will restore follower arm 478 and permitted by the pin 485 the bell crank 482 will restore and the link 425 will tend to drop. Thus depression of the subtract key will cause a cycle in which the register wheels are engaged with the rear (subtract) racks 385 rather than with the front (add) racks 385.

SUB-TOTAL TAKING OPERATION

*(FIGS. 7 and 10)*

A sub-total taking operation is one in which, during a machine cycle the register wheels 397 and stand engaged are with the rack bars 385 during their movement from their 0 position until the end of the cycle.

During a sub-total cycle, cam 59 will rock arm 428 by roller 456 as has been explained before, to disengage the register wheels 397 at the start of a machine cycle. When the actuator bars 177 and racks 385 reach their 0 positions, the register wheels are engaged with rack bars 385 by cam 61 which engages roller 512 to rock arms 462 and 465, as has been set out. At about the mid-cycle point, cam 59 will strike roller 508 to rock lever 509 into the FIGURE 10 position. A lever 513, pivoted on the lower end of lever 510, is biased counterclockwise by a spring 514 so that its forward end, which has an inverted L-shaped slot surrounding a pin 472 will lie at the top of the horizontal portion of such slot. Whenever the machine is conditioned for sub-total taking, an element 506 causes the lever to have a lowered position. Therefore, when lever 509 is rocked to move lever 513 forwardly, there is no motion transmitted to the arm 428 since pin 472 moves idly in the slot. Therefore, register wheels 397 will stay in engagement with rack bars for the remainder of the cycle.

It will be clear from FIGURE 1 that if the register wheels 397 are engaged with rack bars 385 during the upward movement of the racks, the rotation of the wheels 397 and upward movement of racks 385 and actuator bars 177 will be arrested when the wide transfer tooth of a register wheel 397 moving in an upward direction strikes against the end of the transfer pawl 402. The amount represented by the original positions of register wheels 397 will at such time be printed and during the return movement of actuator bars 177, the racks 365 rotate the wheels 397 back to the positions which they had before the sub-total cycle.

It is desirable that the rack bars 385 and actuator bars 177 be properly aligned at the 0 position whenever the register wheels 397 are engaged with the racks. Although the machine cycling mechanism provides for a pause in the movement of the actuators 177 whenever the 0 position is reached, a more precise alignment is preferred and this is obtained by employment of a 0 stop bail 370, see FIGURES 1 and 8. It will be noted from the latter FIGURE that pin 378 on arm 214 is holding the rear end of a slide 373 against rearward movement. This arm 214 is rocked counterclockwise for a time at the start of a machine cycle and during such time will move slide 373 forwardly. This, through a spring 374 will move the 0 stop bail 370 into the notches detent of the actuator bars 177. After the register wheels 397 engage the racks 385, the roller 53 releases lever 214 to allow spring 377 to pull the 0 stop bail 370 out of the detent notches and to enable the actuator 177 to be raised to the required total positions.

TOTAL TAKING OPERATION
(FIGS. 7 and 9)

A total taking operation is the same as the sub-total operation above described with the difference however that the register wheels 397 are automatically disengaged from rack bars 385 at the middle of the machine cycle at which time they will have become cleared out. A total taking operation is initiated by operation of a key, not shown, as fully disclosed in said Patent No. 2,942,776. The cams 59 and 61 will function initially during the cycle first to disengage and then to engage the register wheels as for a sub-total taking. When cam 59 operates the lever 509 at the mid-cycle time, the forward movement of lever 513 will displace arm 428 to remove the register wheels 397 from racks 385, leaving the wheels rotated to their 0 positions.

NEGATIVE TOTALS AND SUB-TOTALS
(FIGS. 3, 4, 11 and 15)

As thus far described, the register wheels 397 will be engaged with the front rack bars 385 during total and sub-total operations. This is correct only so long as the total of the entered items is positive. If, however, the total is a negative one, the wheels 397 are required to become engaged with the rear racks 385, that is the subtract racks. The selection of the appropriate set of racks to be engaged is automatically effected under control of the "Fugitive One" mechanism shown in FIGURE 15 and includes the bail 405. It is a characteristic of the present type of "Fugitive One" mechanism that the transfer bail 405 on the subtract side will become operated whenever the total in the register wheels becomes negative and that the transfer bail 405 on the add side will become operated whenever the total in the wheels becomes positive. A link 520, FIGURE 15, extends between and is supported on two studs 521, one stud being on the lower end of each transfer bail 405. The link has two slots through which studs 521 pass, each slot is equal in length to the movement of a stud 521 when its transfer bail 405 operates to transfer the "Fugitive One." The slots are spaced apart a distance equal to that of the studs 521 when both bails 405 stand latched in their normal position. When either transfer bail 405 effects a transfer, its stud 521 will cause the slide 520 to stand moved in the direction of the operated bail and will leave it there. Any further operation of the same transfer bail 405 will have no effect on the slide 520 but the first operation of the other transfer bail 405 will move it to the other side. The slide 520, in effect, remembers whether the register total is positive or negative.

Slide 520, as shown in FIGURES 4 and 15, has a notch wherewith by means of a pin 524 on arm 522 is connected. The latter is pivoted on a stud 525 and an over-center spring 526 associated with the arm will hold it and the connected slide 520 as moved by the transfer bails 405.

Rockable on the right end of shaft 480 is a credit total lever 528 which is urged counterclockwise by a spring 529 (FIGURE 11) against the pin 485 on the cam follower arm 478. During any cycle, cam 55 rotates and the follower arm 478 swings counterclockwise and the lever 528 tends to follow. If in a total printing cycle the total in the register wheels is positive, the lower end of detent arm 522 will stand positioned above the pin 530 of credit total lever 528 and will prevent an effective movement of lever 528. If, however, the total is negative then the lever 228 stands unobstructed by the arm 522 and thus will rock and lift the register shift link 425 into engagement with the pin 422. Such a shifting of link 425 occurs during the time that the register wheels 397 stand disengaged from the racks 385. It will thus be seen that in total taking cycles the register wheels will engage the appropriate set of racks 385 whether the total happens to be positive or negative.

From the foregoing it will be observed particularly that an efficient tens transfer mechanism has been provided which will permit the execution of a total taking or total printing cycle directly after any amount entering cycle. The above description of a preferred embodiment of the invention is illustrative only, and many variations of structure and functional cooperations of parts are possible without departure from the general spirit of the invention.

What is claimed is:

1. The combination with an adding machine having a plurality of register wheel driving racks, a set of register wheels with which said driving racks are adapted to be meshed, actuators individual to said racks, movable each from normal sub-zero position to different digit value positions, a machine cycling mechanism and means including said cycling mechanism whereby said actuators are movable first to the different digit value positions and then are restored to said sub-zero positions; of a cycling-mechanism-controlled means to engage said racks with said register wheels for the duration of the restoration of said actuators, means individually associating said racks with their related actuators so that while said actuators are being restored, the racks are urged to move in resiliently distended relations thereto equivalent to a tens-transfer suppressing stop element on each rack, a related counterstop element associated with each stop element and normally in cooperative alignment therewith for intercepting its associated rack against movement while said actuators during their restorations move from zero to sub-zero position, said counterstop elements severally mounted for movement to ineffective positions, tens-transfer tooth means on said register wheels, means individual to each register wheel and actuatable by the tens-transfer tooth means thereof to move in respect to the rack of next higher order the stop element and counterstop element relatively out of cooperative alignment, whereby only such of said register wheels as require tens-carry transfer movements will receive such movements, cycling-mechanism-controlled means effective before the actuators are being moved from normal sub-zero position to zero position to render the register disengaged and additional cycling mechanism controlled means thereafter to cause said stop elements relatively to the counterstop elements to resume cooperative alignment substantially by the time the actuators become moved beyond zero position and in association therewith to cause all the actuatable means to restore.

2. The invention set forth in claim 1, a normally ineffective aligner associated with said actuators, a detent on each actuator defining a zero position therefor, a cycling-mechanism controlled means to operate said aligner transitorily for engagement with said detents as the actuators reach zero positions and means including cycling mechanism controlled means to engage said register with said racks for total taking operation while said aligner is active.

3. The combination with an adding machine having a plurality of register wheel driving racks, a set of register wheels with which said driving racks are adapted to be meshed, actuators individual to said racks, movable each from normal sub-zero position to different digit value positions, a machine cycling mechanism and means including said cycling mechanism whereby said actuators are movable first to the different digit value positions and then are restored to said sub-zero positions; of a cycling-mechanism-controlled means to engage said racks with said register wheels for the duration of the restoration of said actuators, means individually associating said racks with their related actuators so that while said actuators are being restored, the racks are urged to move in resiliently distended relations thereto equivalent to a tens-transfer step, a tens-transfer suppressing stop element on each rack, a related counterstop element associated with each stop element and situated normally in a path thereof for intercepting its associated rack against movement while the actuators in their restorations move from zero to sub-zero position, said counterstop elements severally mounted for movement to ineffective positions, means to urge said counterstop elements to their ineffective positions, tens-transfer tooth means on said register wheels, an individual latch normally holding each counterstop element in effective position against the influence of said urging means and each latch being subject to release the tens-carry tooth means on the register wheel of a next lower order, whereby only such of said register wheels as require tens-transfer movements will receive such movements, cycling-mechanism-controlled means effective before the actuators are being moved from normal, sub-zero position to zero position, to render the register disengaged and additional cycling mechanism controlled means thereafter to cause said counterstop elements to resume effective positions with respect to their related stop elements substantially by the time the actuators become moved beyond zero position and in association therewith to cause said latches to restore.

4. The invention set forth in claim 3, said additional means comprising a resilient provision related to each stop element and adapted to allow the restorations of the released latches as the movements of the actuators occur from sub-zero to zero positions and such resilient provision providing automatically that as said zero positions are reached, said stop and counterstop elements become relatively positioned for the former to stand in effective positions relatively to the latter.

5. The combination with an adding machine having a plurality of register wheel driving racks, a set of register wheels with which said driving racks are adapted to be meshed, actuators individual to said racks, movable each from normal sub-zero position to different digit value positions, a machine cycling mechanism and means including said cycling mechanism whereby said actuators are movable first to the different digit value positions and then are restored to said sub-zero positions; of a cycling-mechanism-controlled means to engage said racks with said register wheels for the duration of the restoration of said actuators, means individually associating said racks with their related actuators so that while said actuators are being restored, the racks are urged to move in resiliently distended relations thereto equivalent to a tens-transfer step, a tens-transfer suppressing stop element on each rack, a related counterstop element associated with each stop element and lying normally in a path thereof for intercepting its associated rack against movement while the actuators in their restorations move from zero to sub-zero position, said counterstop elements severally mounted for movement to ineffective positions, tens-transfer tooth means on said register wheels, an individual latch normally holding each counterstop element in effective position, spring means associated with the individually correlated latches and counterstop elements to hold them severally in ineffective positions and subject to release by the tens-transfer tooth means of the next lower order register wheel, whereby such of said register wheels as require tens-transfer movements will receive such movements, a resilient provision related to each stop element and adapted to allow the restoration of the released latches as the movements of the actuators occur from sub-zero to zero positions, and cycling-mechanism-controlled means effective before the actuators are being moved from normal sub-zero to zero position to render the register disengaged, said counterstop elements by reason of said resilient provisions adapted to resume effective positions relatively to their related stop elements whenever the actuators reach zero positions.

References Cited in the file of this patent
UNITED STATES PATENTS

| | | |
|---|---|---|
| 2,004,495 | Sundstrand | June 11, 1935 |
| 2,194,270 | Sundstrand | Mar. 19, 1940 |
| 2,308,940 | Sundstrand | Jan. 19, 1943 |
| 2,646,928 | Parker | July 28, 1953 |